United States Patent
Sans et al.

(10) Patent No.: US 11,634,131 B2
(45) Date of Patent: Apr. 25, 2023

(54) METHOD FOR DETERMINING A MOTOR VEHICLE SPEED PROFILE

(71) Applicants: Continental Automotive France, Toulouse (FR); Continental Automotive GmbH, Hannover (DE)

(72) Inventors: Mariano Sans, Blagnac (FR); Jordan Stekke, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 660 days.

(21) Appl. No.: 16/331,607

(22) PCT Filed: Sep. 14, 2017

(86) PCT No.: PCT/FR2017/052456
§ 371 (c)(1),
(2) Date: Mar. 8, 2019

(87) PCT Pub. No.: WO2018/051024
PCT Pub. Date: Mar. 22, 2018

(65) Prior Publication Data
US 2019/0210599 A1 Jul. 11, 2019

(30) Foreign Application Priority Data
Sep. 15, 2016 (FR) ...................................... 1658636

(51) Int. Cl.
*B60W 30/14* (2006.01)
*G06Q 10/04* (2012.01)
(Continued)

(52) U.S. Cl.
CPC ............ *B60W 30/143* (2013.01); *G06Q 10/04* (2013.01); *G06Q 10/063* (2013.01); *G06Q 50/30* (2013.01);
(Continued)

(58) Field of Classification Search
CPC .......... B60W 30/143; B60W 2720/103; G06Q 10/04; G06Q 10/063; G06Q 50/30; G01S 19/52
(Continued)

(56) References Cited

U.S. PATENT DOCUMENTS

| | | | | |
|---|---|---|---|---|
| 8,972,161 B1* | 3/2015 | Koebler | ................. | B60K 35/00 701/123 |
| 2012/0083984 A1* | 4/2012 | Johansson | ......... | B60W 50/0097 701/70 |
| 2012/0319897 A1* | 12/2012 | Wendel | ................... | H04K 3/22 342/357.54 |

OTHER PUBLICATIONS

Zhao, Y.; Tsiotras,P. 2013, Speed Profile Optimization for Optimal Path Tracking, p. 4 (Year: 2013).*
(Continued)

*Primary Examiner* — Maceeh Anwari
(74) *Attorney, Agent, or Firm* — RatnerPrestia

(57) ABSTRACT

A method for determining a speed profile of a motor vehicle on a route between a starting point and an arrival point. The method includes the steps of defining a series of noteworthy points of the route, which are characterized by a stoppage of the vehicle or a decrease in the speed of the vehicle, the series of noteworthy points dividing the route into a series of portions, for each portion of the route, generating a speed and/or torque setpoint optimizing the speed profile of the vehicle by minimizing the Hamiltonian of a system of equations modeling the driving of the vehicle, and providing the setpoint generated on each portion of the route so as to optimize the driving of the vehicle up to the arrival point.

11 Claims, 3 Drawing Sheets

(51) Int. Cl.
  *G06Q 50/30*     (2012.01)
  *G06Q 10/06*     (2012.01)
  *G01S 19/52*     (2010.01)
  *G06Q 10/063*    (2023.01)

(52) U.S. Cl.
  CPC ........ *B60W 2720/103* (2013.01); *G01S 19/52* (2013.01)

(58) Field of Classification Search
  USPC .......................................................... 701/98
  See application file for complete search history.

(56) References Cited

OTHER PUBLICATIONS

Hamid et al., "Investigation into Train Positioning Systems for Saving Energy with Optimised Train Trajectories", 2016 IEEE International Conference on Intelligent Rail Transportation (ICIRT), Aug. 23, 2016—pp. 460-468.

International Search Report and Written Opinion for International Application No. PCT/FR2017/052456, dated Oct. 30, 2017—10 pages.

Zhao et al., "Speed Profile Optimization for Optimal Path Tracking", 2013 American Control Conference, IEEE, Jun. 17, 2013—pp. 1171-1176.

\* cited by examiner

METHOD FOR DETERMINING A MOTOR VEHICLE SPEED PROFILE

CROSS REFERENCE TO RELATED APPLICATIONS

This application is the U.S. National Phase Application of PCT International Application No. PCT/FR2017/052456, filed Sep. 14, 2017, which claims priority to French Application No. 1658636, filed Sep. 15, 2016, the contents of such applications being incorporated by reference herein.

FIELD OF THE INVENTION

The present invention pertains to the field of motor vehicles, and relates more particularly to a method and a device for managing the driving of a motor vehicle so as to optimize the energy consumption thereof.

BACKGROUND OF THE INVENTION

As is known, a motor vehicle nowadays comprises a driving assistance module for informing the driver with regard to recommended gear changes and with regard to effective speed limits over the course of the route. It is thus known to optimize gear changes so as to reduce the fuel consumption or electrical energy consumption of the vehicle for less polluting and less expensive driving.

In one known solution, the fuel consumption or electrical energy consumption of the vehicle is determined in real time so as to inform the driver thereof in the form of information messages. These messages inform the driver directly as to the value of the consumptions, or else provide him with an indication allowing him to adjust his driving, for example by telling him to slow down below a certain authorized speed limit or else to change gear. The information with regard to the predicted changes in driving conditions on the route may be utilized so as to inform or alert the driver, but not to calculate an optimization of the speed profile of the vehicle. Such a solution therefore does not make it possible to define consumptions that are actually optimal in advance, which exhibits a major drawback.

In another known solution, a previously established speed profile is followed for the route under consideration on the basis of calculations carried out beforehand in the laboratory. Such calculations may prove to be particularly lengthy or even complex, which does not allow them to be performed in real time with an on-board computer, whose capabilities are limited. In addition, the use of a predetermined speed profile does not make it possible to adapt to the occurrence of events detected over the course of the route that require a new speed profile to be recalculated when they arise.

The existing solutions do not make it possible to determine the exact speed profile for minimizing energy consumption of the vehicle for a planned route. There is therefore a need for a solution that makes it possible to calculate, in real time, the speed profile to be recommended for minimizing the energy consumption of a vehicle on the basis of a predetermined route.

SUMMARY OF THE INVENTION

An aim of the invention is to at least partly rectify these drawbacks by proposing a simple, reliable and effective solution for calculating and providing an optimized speed profile to a driver of a motor vehicle on the basis of a predetermined route or of an event arising during driving of the vehicle.

An aspect of the invention relates firstly to a method for determining a speed profile of a motor vehicle on a route between a starting point and an arrival point, said method being noteworthy in that it comprises the steps of:
- defining a series of noteworthy points of the route, which are characterized by a stoppage of the vehicle or a decrease in the speed of the vehicle, said series of noteworthy points dividing the route into a series of portions,
- for each portion of the route, generating a speed and/or torque setpoint optimizing the speed profile of the vehicle by minimizing the Hamiltonian of a system of equations modeling the driving of the vehicle,
- providing the setpoint generated on each portion of the route so as to optimize the driving of the vehicle up to the arrival point.

The method according to an aspect of the invention therefore makes it possible to provide an optimized speed profile on the portions of a route in a simple and fast manner, so as to reduce the fuel consumption and/or electricity consumption of the vehicle. As a natural consequence, it is observed that the following of this optimized speed profile by the driver provides better safety (the speed being filtered and the average speed generally being lowered) and a better guarantee of the predicted arrival time, which may make it possible to improve traffic flow while at the same time consuming less energy.

The method preferably furthermore comprises a preliminary step of determining the arrival point so as to determine the route.

The method advantageously comprises, prior to the step of defining a series of noteworthy points of the route, a step of detecting an event taking place on the route. The optimization of the consumption of the vehicle may thus be adjusted when an event is taking place on the route.

According to one aspect of the invention, the generated setpoint comprises at least one item of information, and the driving of the vehicle is managed by the driver of the vehicle on the basis of said at least one item of information, such management being easy to implement in the vehicle.

According to another aspect of the invention, the management of the driving of the vehicle is at least partly automated, thereby making it easy.

The management of the driving of the vehicle may include for example managing operating parameters of one or more engines of the vehicle (thermal combustion and/or electric).

An aspect of the invention also relates to an electronic control unit for managing the driving of a motor vehicle on a route between a starting point and an arrival point, said electronic control unit being noteworthy in that it is configured so as to define a series of noteworthy points of the route, which are characterized by a stoppage of the vehicle or a decrease in the speed of the vehicle, said series of noteworthy points dividing the route into a series of portions, so as to generate a speed and/or torque setpoint optimizing the speed profile of the vehicle by minimizing the Hamiltonian of a system of equations modeling the driving of the vehicle, and so as to provide the setpoint generated on each portion of the route so as to optimize the driving of the vehicle up to the arrival point.

According to one aspect of the invention, the electronic control unit is configured so as to determine the arrival point.

Advantageously, the electronic control unit is configured so as to detect an event taking place on the route.

According to one feature of an aspect of the invention, the generated setpoint comprising at least one item of information, said electronic control unit is configured so as to send said item of information such that it is displayed for the attention of the driver so that he adjusts his driving of the vehicle on the basis of the displayed item of information.

According to another feature of an aspect of the invention, the electronic control unit is configured so as to control at least some of the operating parameters of the engine of the vehicle so as to adjust the driving thereof.

An aspect of the invention relates lastly to a motor vehicle comprising an electronic control unit such as presented above.

BRIEF DESCRIPTION OF THE DRAWINGS

Other features and advantages of aspects of the invention will become apparent from the following description, given with reference to the appended figures that are given by way of non-limiting example and in which identical references are given to similar objects.

DETAILED DESCRIPTION OF THE PREFERRED EMBODIMENTS

The engine control unit according to an aspect of the invention is intended to be installed in a motor vehicle. The term "motor vehicle" is understood to mean a road vehicle propelled by at least one internal combustion engine, or at least one electric engine or at least one gas turbine such as, for example, a car, a van, a truck, etc.

Figure 1:
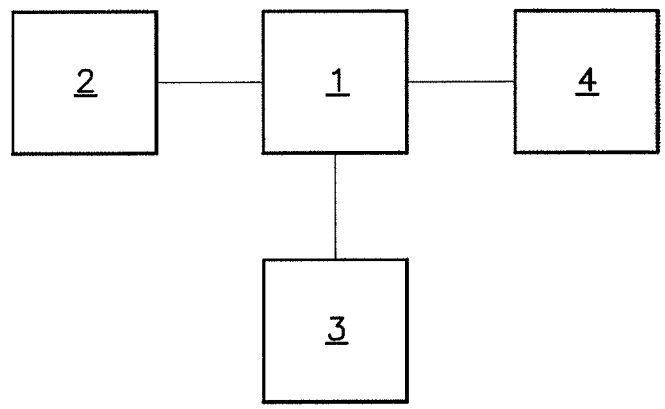
FIG. 1 schematically illustrates one embodiment of an electronic control unit according to an aspect of the invention.

FIG. 1 schematically shows one embodiment of an electronic control unit 1 according to an aspect of the invention.

To collect the information necessary for managing the calculation of the optimized speed profile, the electronic control unit 1 is connected to various modules of the vehicle.

Thus, as illustrated in FIG. 1, the electronic control unit 1 is connected to a speed measurement module 2, to a route determination module 3 and (optionally) to an event detection module 4. It goes without saying that, in another embodiment, the electronic control unit 1 could be connected to a plurality of each of these modules 2, 3, 4 or to other modules or devices (not shown).

The speed measurement module 2, called an odometer, comprises a sensor for measuring the speed of the vehicle, which supplies the speed of the vehicle in real time to the electronic control unit 1. Such a module is known per se and will not be described further here.

The route determination module 3 is configured so as to determine a route of the vehicle between a starting point and an arrival point, which are for example provided by the driver or else determined by the electronic control unit 1, and so as to predict the parameters of this route.

To this end, the route determination module 3 comprises a location submodule and a prediction submodule (which are not shown).

The location submodule may be of GNSS (global navigation satellite system), for example GPS, type.

The prediction submodule is configured so as to predict the parameters of this route. This submodule may take the form of an "electronic horizon" ("eHorizon") submodule, known to those skilled in the art, which is coupled to the location submodule and which makes it possible to predict information and events that are able to be predicted by this system on the planned route. As such submodules are known per se, they will not be described further here.

The event detection module 4 makes it possible to detect, in a manner known per se, events arising over the course of the route, such as for example obstacles, speed reductions, etc.

The electronic control unit 1 is configured so as to determine the speed profile to be optimized along a route determined by the route determination module 3 so as to reduce fuel consumption (in the case of a vehicle with a thermal combustion engine or of a hybrid vehicle) and/or the energy level of one or more electrical energy storage batteries (in the case of a vehicle with an electric engine or of a hybrid vehicle). As a variant, it may also be contemplated to optimize the distribution between the torques of the thermal combustion and electric engines in the case of a hybrid vehicle, or else the travel time of the route. The parameters to be optimized may be static, that is to say always the same regardless of the determined route, or else dynamic, that is to say different from one route to another, or variable over the course of a determined route.

To this end, the electronic control unit 1 is first of all configured so as to determine the starting point and the arrival point of a route that the vehicle is to travel.

The electronic control unit 1 is then configured so as to define a series of noteworthy points of a route determined by the route determination module 3. As a variant, the series of noteworthy points may be determined by the route determination module 3 and the electronic control unit 1 is in this case configured so as to receive said series from the route determination module 3.

Such a series of noteworthy points associated with a route make it possible to divide the route into a series of portions. The noteworthy points of the route preferably characterize known locations of the route at which the vehicle is likely to stop or to slow down to a large extent (for example to below 30 km/h or by more than 50% of the speed). By way of nonlimiting example, these noteworthy points may be for example a roundabout, a crossroads, a speed bump, a change of speed limit, etc. for static predictable data.

The electronic control unit 1 is also configured so as to detect a predictable event taking place on the route, such as for example slowing down of traffic, an accident, a traffic light changing from green to red or vice versa, roadworks, weather constraints, etc. for dynamic predictable data.

The electronic control unit 1 is additionally configured so as to generate, for each portion of a series that it has defined, a setpoint for a vehicle speed profile and for controlling the engine or engines of the vehicle, optimizing a previously determined set of parameters. In other words, each setpoint makes it possible to control the engine of the vehicle on the associated portion of the route up to the arrival point.

This setpoint is generated from a plurality of imposed constraints (i.e. conditions), which are at least the position and the speed of the vehicle at the starting point and the position and the speed of the vehicle at the arrival point of the determined route. Other constraints may be used, such as the values of battery charge measured at the starting point and targeted at the arrival point, or else a travel time of the route.

The setpoint is generated from the predetermined constraints by minimizing the Hamiltonian of a system of equations modeling the control of the engine of the vehicle and comprising the determined set of parameters, as will be described hereinafter.

A setpoint generated by the electronic control unit 1 may be used in various ways so as to control the operating parameters of the vehicle.

For example, the generated setpoint may comprise at least one item of information, and the electronic control unit 1 is then configured so as to send said item of information such that it is displayed for the attention of the driver, for example on a screen or on the dashboard, so that he adjusts his driving of the vehicle himself on the basis of the displayed item of information.

The electronic control unit 1 may preferably be configured so as to recalculate the route and the optimized speed profile between a starting point corresponding to the current location of the vehicle and a previously or newly determined arrival point during driving of the vehicle, in particular when a new event likely to modify the energy consumption of the vehicle arises.

As a variant or in addition, the electronic control unit 1 may be configured so as to control at least some of the operating parameters of the engine of the vehicle itself so as to adjust the driving thereof. In other words, the electronic control unit 1 may apply the generated setpoint to the engine itself so as to optimize the driving thereof in terms of consumption.

An aspect of the invention will now be described in terms of the implementation thereof with reference to FIGS. 2 to 5.

Figure 2:
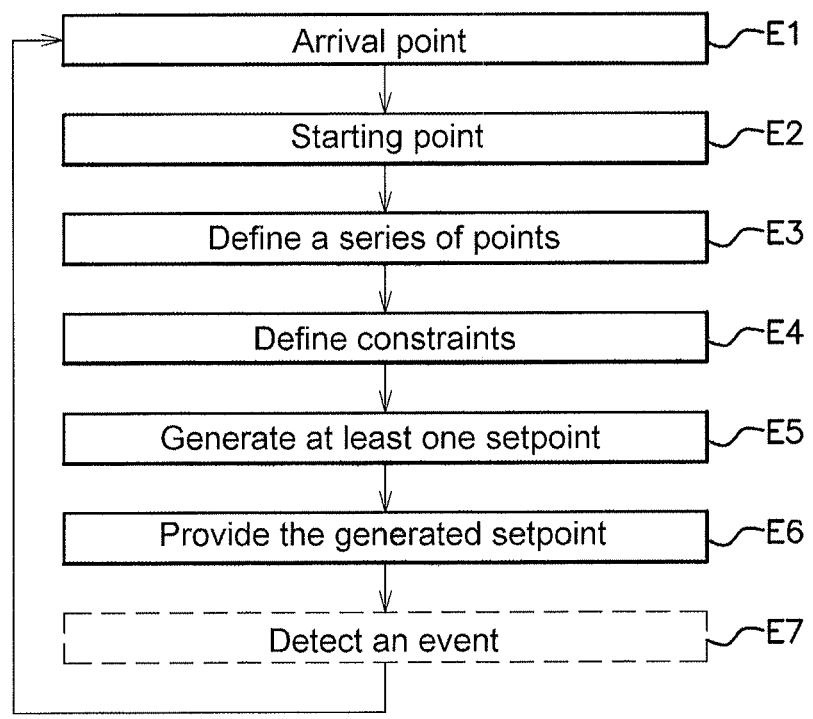
FIG. 2 schematically illustrates one embodiment of the method according to an aspect of the invention.

First of all, as illustrated in FIG. 2, in a step E1, the electronic control unit 1 determines an arrival point of the route. This arrival point may be provided by a user of the vehicle, for example via the route determination module 3, or determined directly by the electronic control unit 1.

The electronic control unit 1 then determines a starting point in a step E2. The starting point preferably corresponds to the current location of the vehicle.

According to an aspect of the invention, the electronic control unit 1 is configured so as to determine the optimized speed profile of the vehicle as a function of time (for any type of vehicle). The electronic control unit 1 may also advantageously be configured so as to determine the distribution of the torque between a thermal combustion engine and an electric engine as a function of time in the case of a hybrid vehicle. From this, the recommended speed setpoint to be displayed and/or the setpoint for the torque at the vehicle wheels and for engine controls in the case of a hybrid vehicle will be deduced as described below.

In a step E3, the electronic control unit 1 then defines a series of noteworthy points of the route, which are characterized by a stoppage of the vehicle or a decrease in the speed of the vehicle. These points may be determined in a manner known per se on the basis of obstacles or speed reductions depending on the configuration of the route. As a variant, these points may be provided by the route determination module 3.

For each noteworthy point of the route, in a step E4, a speed constraint C that corresponds to a limit speed at this point of the route is defined. This constraint may be recalculated on the basis of the information provided by the prediction system. For example, in the case of a speed reduction due to traffic jams, these constraints may change and therefore be updated. It is also additionally possible to contemplate a general limit in terms of acceleration for the comfort of the vehicle passengers, for example in the form of a post-processing step.

This series of noteworthy points makes it possible to divide the route into a series of successive portions, for each of which a setpoint for managing the driving of the vehicle will be generated in a step E5.

These setpoints are obtained by minimizing the Hamiltonian of a system of equations modeling the control of the vehicle and comprising the set of determined parameters.

Such minimization corresponds to the application of the Pontryagin maximum principle (known under the name PMP), which is known per se, for optimizing control of the vehicle and thus saving energy for the vehicle.

To minimize the energy over the course of a given route, in this example, initial conditions (constraints) are defined, which are a zero speed at the starting point, and objectives are defined, which are a desired final speed at the arrival point, at a given distance from the starting point. It will be noted that the speed at the starting point may be nonzero when the electronic control unit 1 implements the method while the vehicle is moving. It will also be noted that the desired final speed upon arrival may be nonzero, in the case for example of reaching areas with speed reductions (urban areas, toll gates, notice of heavy traffic, etc.).

Two preferred but nonlimiting examples of setpoint generation will now be illustrated with reference to FIGS. 3 to 5.

Figure 5:
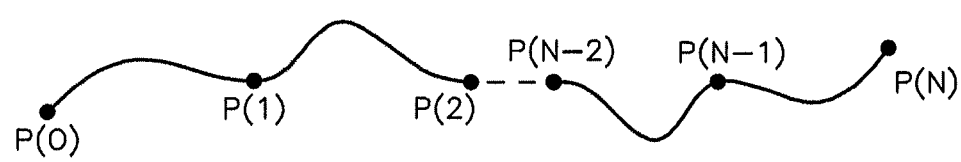
FIG. 5 schematically illustrates the route of a motor vehicle divided into a plurality of portions.

With reference first of all to FIG. 5, P(0), P(N) denotes the N noteworthy points defining the portions of the route, P(0) being the starting point, P(N) the arrival point and P(1), . . . , P(N−1) the intermediate noteworthy points of the route.

A first algorithm PMP1 is applied between a point P(i) and a point P(k), denoted PMP1(i→k), in which the final speed of the vehicle at the point P(k) is not fixed (said to be "with free final speed"), and a second algorithm PMP2 is applied between a point P(i) and a point P(k), denoted PMP2(i→k), in which the final speed of the vehicle at the point P(k) is fixed (said to be "with fixed final speed"), i being a natural integer and k being a natural integer greater than or equal to 1. The initial and final positions will always be fixed, to the current position of the vehicle and to the position of the arrival point, assumed to be known, respectively.

The general PMP method is based on solving optimality conditions in the form of partial differential equations applied to a particular function called Hamiltonian ("H") containing the information on the criterion to be optimized and on the dynamics of the system and its constraints. This solution may be performed analytically or numerically depending on the complexity of the problem, as described below, in one possible exemplary implementation.

The simplified basic state equations representing the dynamic system of the vehicle are for example (according to the fundamental principle of dynamics, and with notations that are routine to those skilled in the art):

$$\frac{dx}{dt} = v \text{ (position gradient = speed)}$$

$$\frac{dv}{dt} = F/m - g \cdot \sin \alpha,$$

(speed gradient = sum of the forces present)

where a is the incline of the slope of the road, F is the applied force to be calculated, m is the mass of the vehicle and g is the gravitational constant (g=9.81 m/s²).

To define the Hamilton function, the term L (known per se) corresponding to the energy of the applied force in F² is first of all defined in the form of a Lagrangian:

$$L=F^2+\mu$$

where μ is equal to the weighting coefficient on the time term.

The adjunct states associated with the basic state equations, in this case noted $\lambda_1$ and $\lambda_2$, which represent the conditions of the dynamic behavior of the physical system, and which will allow the optimization problem to be solved completely, are also introduced.

The Hamilton function becomes:

$$H=L+\lambda_1 \cdot v+\lambda_2 \cdot (F/m-g \cdot \sin \alpha)$$

The 4 main optimality equations on the Hamiltonian will be:

$$\dot{\lambda}_1 = \frac{\partial H}{\partial x},$$

which makes it possible to calculate the first adjunct state $\lambda_1$, $$\dot{\lambda}_2 = \frac{\partial H}{\partial v},$$

which makes it possible to calculate the second adjunct state $\lambda_2$, $$\frac{\partial H}{\partial F} = 0,$$

which makes it possible to calculate the optimum control F, and $$H(T)=0,$$

where T is the value of the final time (i.e. the duration of the route) that is calculated from this equation so as also to optimize the "time" parameter.

The method PMP1 "with free final speed" is characterized by a particular additional optimality equation, as shown below, in one possible exemplary implementation:

$$\lambda_2(T)=0,$$

where T is the value of the final time, this equation making it possible to calculate the final speed obtained in this particular optimization.

In this case, we therefore obtain a system formed of the 5 abovementioned optimality equations for 5 unknown variables: the 3 functionals (depending on the time) ($\lambda_1$, $\lambda_2$, F), plus the final time T, plus the final speed v(T), which will able to be solved either analytically or numerically.

The method PMP2 "with fixed final speed" is characterized by the 4 first abovementioned optimality conditions, in which the final speed v(T) is fixed and equal to $v_f$, making it possible to directly solve the 3 unknown functionals ($\lambda_1$, $\lambda_2$, and F) and the final time T.

These two methods PMP1 and PMP2 will be combined as described below.

Figure 3:
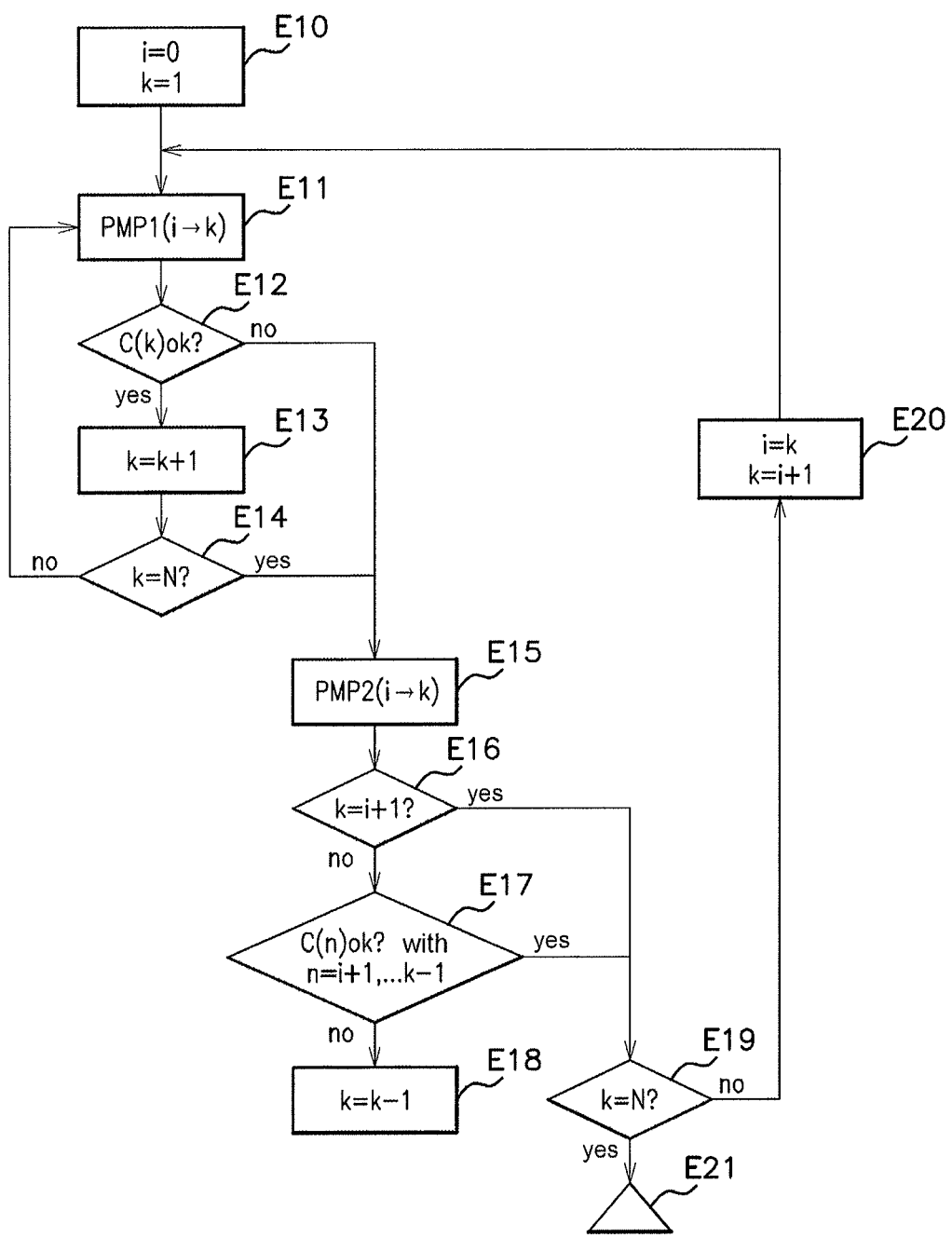
FIG. 3 is a first exemplary application of the method according to an aspect of the invention.

First Example (FIG. 3)

Starting from the starting point P(i=0) with k=1 (step E10), the algorithm PMP1 is first of all applied (step E11) between P(i) and P(k), and it is then checked that the speed thus calculated at the point P(k) satisfies the predetermined speed constraint C(k) at this point (step E12).

If not, we move to step E15 described below.

If so, the value of k is incremented by one unit (step E13) and it is checked whether k=N (step E14).

If there is a negative result in step E14, we return to step E11 in order to apply the algorithm PMP1 between i=0 and k, and then steps E12 to E14 are resumed.

If step E14 is affirmative, we move to step E15.

Steps E11 to E14 are thus performed for various values of k (i.e. various points P(k) of the route) until k=N or a speed constraint is not satisfied at one of the points P(k).

Starting from the point P(i), there are therefore k−i points that satisfy the constraints from C(i) to C(k) by applying PMP algorithms with free final speed (PMP1); the aim is now to check that these points also satisfy the constraints by applying PMP algorithms with fixed final speed (PMP2). To this end, in contrast to the previous loop in which they were tested in increasing order from the point P(i), in this case they are tested in decreasing order from the point P(k).

In step E15, PMP2 is applied between i and k for the current value of k, and it is then checked whether or not k is equal to i+1 (step E16).

If so, this means that P(i) and P(k) are two successive points, that there are therefore no intermediate constraints, and that the constraints are therefore necessarily complied with since only those of the starting point and of the arrival point are used as parameters for our simulation; we then move to step E19.

If not, it is checked whether each speed constraint C(n) is satisfied for the points n between i+1 and k−1 (inclusive) in step E17.

If so, we move to step E19.

If not, the value of k is decremented by one unit (step E18), and then we resume at step E15, etc.

It will be noted that the route provided by PMP2 could be saved at this stage, because the journey thus preferably is retained for each portion i→k, so as to ultimately have a complete journey going from P(0) to P(N).

In step E19, it is checked whether k=N.

If not, i is made equal to the current k and k is made equal to i+1 (step E20), and then the method is resumed at step E11 with these new values. The idea of step E20 is to use the arrival point P(k) of the previous loop as a starting point P(i) for the next loop. k is then set as the point following i for the remainder of the tests.

If so, the method ends (E21), the last applied algorithm PMP2 defining the speed profile of the vehicle on the route, that is to say the series of setpoints to be respectively applied to the engine on the series of portions of the route.

This first example makes it possible advantageously to use both PMP1 and PMP2 to define an optimized speed profile.

Figure 4:
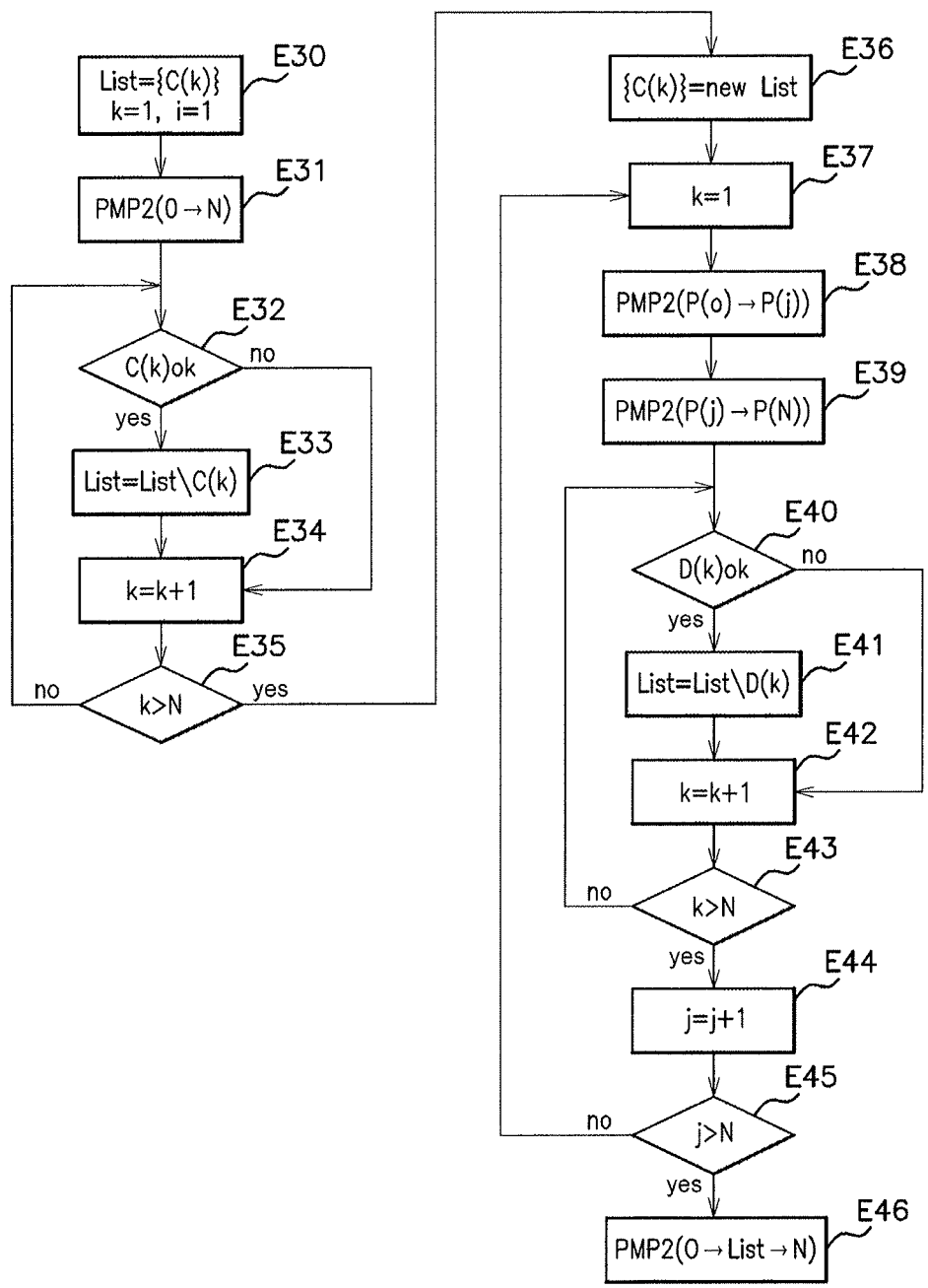
FIG. 4 is a second exemplary application of the method according to an aspect of the invention.

Second Example (FIG. 4)

A list of the predetermined speed constraints C(k) is defined (k being between 1 and N), and then we first of all set k=1 and i=1 (step E30), and then PMP2 is applied between the starting point P(0) and the arrival point P(N) in a step E31.

It is then checked whether the speed constraint C(k) at the current point k is complied with (step E32).

If not, we move to step E34.

If so, the constraint C(k) is removed from the list of constraints (step E33), and then we move to step E34.

In step E34, the value of k is incremented by one unit, and then we move to a step E35, in which it is checked whether k is strictly greater than N.

If not, the method is resumed at step E32 with the current value of k.

If so, we move to a step E36, in which a new list of constraints D(k) is defined (k being a natural integer between 1 and N), comprising only the speed constraints that have not been complied with in step E32, in the order of the noteworthy points of the series.

We then set k=1 (step E37) and, in a step E38, PMP2 is applied between the starting point P(0) and the point P(j) corresponding to the examined constraint in the new list of constraints (the first constraint in the first implementation of step E37), and then, in a step E39, PMP2 is applied between said point P(j) and the arrival point P(N).

It is then checked, in a step E40, whether the speed constraint D(k) is complied with. The idea of this loop is to start from k=1 and to test all of the points of the list {D(k)} over the journey from the starting point to the arrival, passing through a single intermediate point D(j) of the list {D(k)}. If a point D(k) is complied with, then it will not be constrictive in the calculation of the journey, and it is therefore eliminated from the list of constraint points {D(k)}. It will be noted that, for the point k=j, the speed limit is complied with since passing through D(j) is imposed.

If the speed constraint D(k) is not complied with, we move to step E42.

If it is, the constraint D(k) corresponding to the point P(k) is removed from the new list of constraints in a step E41, and then we move to step E42.

In step E42, the value of k is incremented by one unit, and it is then checked, in a step E43, whether k is strictly greater than N.

If not, we resume at step E40.

If so, the value of j is incremented by one unit (step E44), and it is then checked whether j is strictly greater than N (step E45).

If not, we move to step E37.

If so, in a step E46, the algorithm PMP2 is applied between the starting point P(0) and the arrival point P(N) passing through all of the remaining points P(k) in the new list of constraints D(k) so as to define the speed profile, that is to say the series of setpoints to be respectively applied to the engine on the series of portions of the route.

Once the setpoints have been generated by the electronic control unit 1, each setpoint is provided, in a step E6, on the corresponding portion of the route traveled by the vehicle until reaching the arrival point determined in step E1.

In one embodiment, each generated setpoint comprises one or more items of information that are displayed by the electronic control unit 1 on a screen or on the dashboard for the attention of the driver. In this case, the driver controls his speed on the basis of the displayed information so as to adjust his driving and optimize the use of the energy of the vehicle.

In another embodiment, the management of the operating parameters of the engine of the vehicle is at least partly automated, that is to say that the electronic control unit 1 manages all or some of the operating parameters of the engine so as to adjust the driving of the vehicle on each of the portions of the route.

During the route, the electronic control unit 1 is able to detect a new event at any time in a step E7, such as for example the driver not complying with a generated setpoint, a red traffic light, an accident, an obstacle (provided that said obstacle is detected with enough time to be able to perform the calculations of the new associated speed profile), etc.

In this case, the electronic control unit 1 may, if the event influences the arrival point, redefine a new arrival point, and then redefine driving management setpoints on the basis of the same set of parameters or of a new set of parameters, as described above, in order to optimize the use of the energy of the vehicle again and in real time.

The method according to an aspect of the invention therefore makes it possible to effectively determine an optimized speed profile for the vehicle on the various portions of the route on the basis of appropriate constraints.

Finally, it is clarified that aspects of the present invention are not limited to the examples described above, and is open to variants that are accessible to those skilled in the art.

The invention claimed is:

1. A method for determining a speed profile of a motor vehicle on a route between a starting point and an arrival point, said method comprising:

receiving, by a global navigation satellite system (GNSS) of the vehicle, location information along the route;

defining, by a vehicle processor, a series of noteworthy points P(0), . . . , P(N) of the location information along the route, which are noteworthy due to a stoppage of the vehicle or a decrease in a speed of the vehicle, said series of noteworthy points dividing the route into a series of portions;

for each portion of the route, generating, by the vehicle processor, a speed and/or torque setpoint optimizing the speed profile of the vehicle so as to minimize energy consumption by minimizing a Hamiltonian of a system of equations modeling the driving of the vehicle, containing information on a criterion to be optimized and on dynamics of the system and its constraints, the vehicle processor performing the following steps:

a) applying a first algorithm implementing a Pontryagin Maximum Principle (PMP1) between a point P(i) and a point P(k), in which the final speed of the vehicle at the point P(k) is not fixed, and applying a second algorithm implementing the Pontryagin Maximum Principle (PMP2) between a point P(i) and a point P(k), in which the final speed of the vehicle at the point P(k) is fixed, i being a natural integer and k being a natural integer greater than or equal to 1, b) starting from a starting point P(i=0 with k=1), c) applying the first algorithm between a point P(i) and a point P(k), in which the final speed of the vehicle at the point P(k) is not fixed, d) checking that the speed calculated at the point P(k) satisfies a predetermined speed constraint C(k) at the point P(k), e) when the speed calculated at the point P(k) does not satisfy the predetermined speed constraint C(k) at the point P(k), skip steps (f)-(k) and execute step (l), f) when the speed calculated at the point P(k) satisfies the predetermined speed constraint C(k) at the point P(k), incrementing the value of k by one unit and, checking whether k=N, g) when k≠N repeat step (c)

h) when k=N, skip steps (i)-(k) and execute step (l), i) performing steps (c)-(f) for various values of k corresponding to various points P(k) of the route until k=N or a speed constraint is not satisfied at one of the points P(k), j) starting from the point P(i) there are—k−i points that satisfy constraints from C(i) to C(k) by applying first algorithms PMP1, k) checking that the k−i points also satisfy the constraints by applying second algorithms PMP2 between said one point P(i) and one point P(k), in which the final speed of the vehicle at the point P(k) is fixed, by testing the points in decreasing order from the point P(k), in contrast to PMP1 in which the points were tested in increasing order from the point P(i), l) applying the second algorithm PMP2 between said one point P(i) and one point P(k) for the current value of k, and checking whether or not k is equal to i+1, m) when k is equal to i+1, determining that P(i) and P(k) are two successive points, skip steps (n)-(p) and execute step (g), n) when k is not equal to i+1, checking whether each speed constraint C(n) is satisfied for the points n between i+1 and k−1 inclusive, o) when speed constraint C(n) is satisfied for the points n between i+1 and k−1 inclusive, skip step (p) and execute step (g), p) when speed constraint C(n) is not satisfied for the points n between i+1 and k−1 inclusive, decrementing the value of k by one unit, and then repeat step (l), q) checking whether k=N, r) when k≠N, making i equal to the current k and making k equal to i+1, and then repeat step (c) with these new values, and set k as the point following i, and s) when k=N, ending the last algorithm PMP2 applied defining the speed profile of the vehicle on said route, the speed profile including a setpoint generated on each portion of the route so as to optimize the driving of the vehicle up to the arrival point;

providing, by the vehicle processor, the setpoint generated on each portion of the route; and autonomously controlling, by the vehicle processor, the driving dynamics of the vehicle based on the setpoint.

2. The method as claimed in claim 1, furthermore comprising a preliminary step of determining the arrival point.

3. The method as claimed in claim 2, comprising a step of detecting an event taking place on the route.

4. The method as claimed in claim 1, comprising a step of detecting an event taking place on the route.

5. The method as claimed in claim 1, wherein the generated setpoint comprises at least one item of information, and the driving of the vehicle is managed by the driver of the vehicle on the basis of said at least one item of information.

6. An electronic control unit for managing the driving of a motor vehicle on a route between a starting point and an arrival point, said electronic control unit including:

a global navigation satellite system (GNSS) of the vehicle, configured to receive location information along the route; and a vehicle processor configured to:

define, a series of noteworthy points P(0), ..., P(N) of the location information along the route, which are noteworthy due to a stoppage of the vehicle or a decrease in the speed of the vehicle, said series of noteworthy points dividing the route into a series of portions;

for each portion of the route, generate, a speed and/or torque setpoint optimizing the speed profile of the vehicle so as to minimize the energy consumption by minimizing a Hamiltonian of a system of equations modeling the driving of the vehicle, and perform the steps as follows:

a) apply a first algorithm implementing a Pontryagin Maximum Principle (PMP1) between a point P(i) and a point P(k), in which the final speed of the vehicle at the point P(k) is not fixed, and a second algorithm implementing a Pontryagin Maximum Principle (PMP2) between a point P(i) and a point P(k), in which the final speed of the vehicle at the point P(k) is fixed, i being a natural integer and k being a natural integer greater than or equal to 1, b) start from a starting point P(i=0 with k=1), c) apply the first algorithm between a point P(i) and a point P(k), in which the final speed of the vehicle at the point P(k) is not fixed, d) check that the speed calculated at the point P(k) satisfies a predetermined speed constraint C(k) at the point P(k), e) when the speed calculated at the point P(k) does not satisfy the predetermined speed constraint C(k) at the point P(k), skip steps (f)-(k) and execute step (l), f) when the speed calculated at the point P(k) satisfies the predetermined speed constraint C(k) at the point P(k), increment the value of k by one unit and check whether k=N, g) when k≠N repeat step (c), h) when k=N, skip steps (i)-(k) and execute step (l), i) perform steps (c)-(f) for various values of k corresponding to various points P(k) of the route until k=N or a speed constraint is not satisfied at one of the points P(k), j) start from the point P(i) there are k−i points that satisfy constraints from C(i) to C(k) by applying first algorithms PMP1, k) check that the k−i points also satisfy the constraints by applying second algorithms PMP2 between said one point P(i) and one point P(k), in which the final speed of the vehicle at the point P(k) is fixed, by testing the points in decreasing order from the point P(k), in contrast to PMP1 in which the points were tested in increasing order from the point P(i), l) apply the second algorithm PMP2 between said one point P(i) and one point P(k) for the current value of k, and then check whether or not k is equal to i+1, m) when k is equal to i+1, determining that P(i) and P(k) are two successive points, skip steps (n)-(p) and execute step (g), n) when k is not equal to i+1, check whether each speed constraint C(n) is satisfied for the points n between i+1 and k−1 inclusive, o) when speed constraint C(n) is satisfied for the points n between i+1 and k−1 inclusive, skip step (p) and execute step (g), p) when speed constraint C(n) is not satisfied for the points n between i+1 and k−1 inclusive, decrement the value of k by one unit, and then repeat step (l), g) check whether k=N,
r) when k≠N, make i equal to the current k and make k equal to i+1, and then repeat step (c) with these new values, and set k as the point following i, and
s) when k=N, end the last algorithm PMP2 applied defining the speed profile of the vehicle on said route, the speed profile including a setpoint generated on each portion of the route so as to optimize the driving of the vehicle up to the arrival point;

provide the setpoint generated on each portion of the route; and autonomously controlling the driving dynamics of the vehicle based on the setpoint.

7. The electronic control unit as claimed in claim 6, said electronic control unit being configured so as to determine the arrival point.

8. The electronic control unit as claimed in claim 6, said electronic control unit being configured so as to detect an event taking place on the route.

9. The electronic control unit as claimed in claim 6, said electronic control unit being configured so as to control operating parameters of the engine of the vehicle so as to adjust the driving thereof.

10. The electronic control unit as claimed in claim 6, said electronic control unit being configured so as to detect an event taking place on the route.

11. A motor vehicle comprising an electronic control unit for managing the driving of a motor vehicle on a route between a starting point and an arrival point, said electronic control unit including:

a global navigation satellite system (GNSS) of the vehicle, configured to receive location information along the route; and a vehicle processor configured to:
define, a series of noteworthy points P(0), . . . , P(N) of the location information along the route, which are noteworthy due to a stoppage of the vehicle or a decrease in the speed of the vehicle, said series of noteworthy points dividing the route into a series of portions;

for each portion of the route, generate, a speed and/or torque setpoint optimizing the speed profile of the vehicle so as to minimize the energy consumption by minimizing a Hamiltonian of a system of equations modeling the driving of the vehicle, and perform the steps as follows:
a) apply a first algorithm implementing a Pontryagin Maximum Principle (PMP1) between a point P(i) and a point P(k), in which the final speed of the vehicle at the point P(k) is not fixed, and a second algorithm implementing a Pontryagin Maximum Principle (PMP2) between a point P(i) and a point P(k), in which the final speed of the vehicle at the point P(k) is fixed, i being a natural integer and k being a natural integer greater than or equal to 1,
b) start from a starting point P(i=0 with k=1),
c) apply the first algorithm between a point P(i) and a point P(k), in which the final speed of the vehicle at the point P(k) is not fixed,
d) check that the speed calculated at the point P(k) satisfies a predetermined speed constraint C(k) at the point P(k),
e) when the speed calculated at the point P(k) does not satisfy the predetermined speed constraint C(k) at the point P(k), skip steps (f)-(k) and execute step (l),
f) when the speed calculated at the point P(k) satisfies the predetermined speed constraint C(k) at the point P(k), increment the value of k by one unit and check whether k=N,
g) when k≠N, repeat step (c),
h) when k=N, skip steps (i)-(k) and execute step (l),
i) perform steps (c)-(f) for various values of k corresponding to various points P(k) of the route until k=N or a speed constraint is not satisfied at one of the points P(k),
j) start from the point P(i) there are k−i points that satisfy constraints from C(i) to C(k) by applying first algorithms PMP1,
k) check that the k−i points also satisfy the constraints by applying second algorithms PMP2 between said one point P(i) and one point P(k), in which the final speed of the vehicle at the point P(k) is fixed, by testing the points in decreasing order from the point P(k), in contrast to PMP1 in which the points were tested in increasing order from the point P(i),
l) apply the second algorithm PMP2 between said one point P(i) and one point P(k) for the current value of k, and then check whether or not k is equal to i+1,
m) when k is equal to i+1, determining that P(i) and P(k) are two successive points, skip steps (n)-(p) and execute step (q),
n) when k is not equal to i+1, check whether each speed constraint C(n) is satisfied for the points n between i+1 and k−1 inclusive,
o) when speed constraint C(n) is satisfied for the points n between i+1 and k−1 inclusive, skip step (p) and execute step (q),
p) when speed constraint C(n) is not satisfied for the points n between i+1 and k−1 inclusive, decrement the value of k by one unit, and then repeat step (l),
q) check whether k=N,
r) when k≠N, make i equal to the current k and make k equal to i+1, and then repeat step (c) with these new values, and set k as the point following i, and
s) when k=N, end the last algorithm PMP2 applied defining the speed profile of the vehicle on said route, the speed profile including a setpoint generated on each portion of the route so as to optimize the driving of the vehicle up to the arrival point;

provide the setpoint generated on each portion of the route; and autonomously controlling the driving dynamics of the vehicle based on the setpoint.

* * * * *